United States Patent
Akamatsu et al.

(10) Patent No.: US 9,003,800 B2
(45) Date of Patent: Apr. 14, 2015

(54) GAS TURBINE COMBUSTOR

(75) Inventors: Shinji Akamatsu, Tokyo (JP); Hiroaki Kishida, Tokyo (JP); Kenji Sato, Tokyo (JP); Kentaro Tokuyama, Tokyo (JP); Keisuke Matsuyama, Tokyo (JP); Takayoshi Takashima, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/539,559

(22) Filed: Jul. 2, 2012

(65) Prior Publication Data

US 2013/0008167 A1 Jan. 10, 2013

(30) Foreign Application Priority Data

Jul. 7, 2011 (JP) ................................. 2011-151310

(51) Int. Cl.
| | | |
|---|---|---|
| *F02C 7/24* | (2006.01) | |
| *F02C 1/00* | (2006.01) | |
| *F02G 3/00* | (2006.01) | |
| *F02C 3/00* | (2006.01) | |
| *F23R 3/00* | (2006.01) | |

(52) U.S. Cl.
CPC .............. *F23R 3/002* (2013.01); *F23M 99/005* (2013.01); *F23R 2900/00014* (2013.01)
USPC ................. 60/725; 60/752; 60/754; 60/39.37

(58) Field of Classification Search
USPC ................................. 60/725, 752–760, 39.37
See application file for complete search history.

(56) References Cited

U.S. PATENT DOCUMENTS

| | | | |
|---|---|---|---|
| 4,944,362 A | | 7/1990 | Motsinger et al. |
| 6,530,221 B1 * | | 3/2003 | Sattinger et al. ................ 60/725 |
| 7,104,065 B2 * | | 9/2006 | Benz et al. ...................... 60/725 |

(Continued)

FOREIGN PATENT DOCUMENTS

| | | | | |
|---|---|---|---|---|
| CN | 1551965 A | 12/2004 | | |
| EP | 0269824 B1 * | 10/1987 | ................ | F23R 3/28 |

(Continued)

OTHER PUBLICATIONS

Fritche, "Origin and Control of Thermacoustic Instabilities in Lean Premixed Gas Turbine Combustion", 1976, Swiss Federal Institute of Technology Zurich pp. 51-52.*

(Continued)

*Primary Examiner* — Phutthiwat Wongwian
*Assistant Examiner* — William Breazeal
(74) *Attorney, Agent, or Firm* — Westerman, Hattori, Daniels & Adrian, LLP

(57) ABSTRACT

A gas turbine combustor is provided with a combustor basket where combustion gas flows, the combustion gas being produced by combustion of fuel injected from a nozzle, and a first resonance device and a second resonance device mounted on an outer surface of the combustor basket. The second resonance device is disposed on a downstream side from the first resonance device in a flow of the combustion gas and damps combustion oscillation of a frequency higher than the first resonance device. The first and second resonance devices are acoustic liners each having a housing mounted to the outer surface of the combustor basket. A resonance space surrounded by the housing and the outer surface of the combustor basket communicates with an interior space of the combustor basket via a plurality of acoustic holes formed in the combustor basket.

10 Claims, 2 Drawing Sheets

(56) References Cited

U.S. PATENT DOCUMENTS

| | | | |
|---|---|---|---|
| 7,788,926 | B2 | 9/2010 | Johnson et al. |
| 2002/0088233 | A1* | 7/2002 | Ohnishi et al. ............... 60/725 |
| 2003/0233831 | A1 | 12/2003 | Suenaga et al. |
| 2004/0248053 | A1 | 12/2004 | Benz et al. |
| 2008/0041058 | A1* | 2/2008 | Johnson et al. ............... 60/725 |
| 2008/0179837 | A1* | 7/2008 | Ryan ............................. 277/591 |
| 2010/0313568 | A1* | 12/2010 | Davis et al. ................... 60/725 |
| 2011/0048021 | A1* | 3/2011 | Slobodyanskiy et al. ...... 60/725 |
| 2011/0138812 | A1 | 6/2011 | Johnson |
| 2011/0179795 | A1* | 7/2011 | Johnson et al. ............... 60/725 |
| 2013/0074501 | A1* | 3/2013 | Tiwary et al. ................. 60/725 |

FOREIGN PATENT DOCUMENTS

| | | | |
|---|---|---|---|
| EP | 0576717 | A1 | 1/1994 |
| JP | 2-161134 | A | 6/1990 |
| JP | 6-159033 | A | 6/1994 |
| JP | 2001-254634 | A | 9/2001 |
| JP | 2002-317933 | A | 10/2002 |
| JP | 2003-65536 | A | 3/2003 |
| JP | 2004-44538 | A | 2/2004 |
| JP | 2005-76982 | A | 3/2005 |
| JP | 2005-076982 | A | 3/2005 |
| JP | 2005-264729 | A | 9/2005 |
| JP | 2005-527761 | A | 9/2005 |
| JP | 2005-315473 | A | 11/2005 |
| JP | 2006-9788 | A | 1/2006 |
| JP | 2006-97981 | A | 4/2006 |
| JP | 2006-97983 | A | 4/2006 |
| JP | 2006-132505 | A | 5/2006 |
| JP | 2006-226286 | A | 8/2006 |
| JP | 2006-266671 | A | 10/2006 |
| JP | 2006-300062 | A | 11/2006 |
| JP | 2006-329194 | A | 12/2006 |
| JP | 2006-348932 | A | 12/2006 |
| JP | 2007-46596 | A | 2/2007 |
| JP | 2007-46773 | A | 2/2007 |
| JP | 2007-107540 | A | 4/2007 |
| JP | 2007-509270 | A | 4/2007 |
| JP | 2007-127122 | A | 5/2007 |
| JP | 2007-132640 | A | 5/2007 |
| JP | 3930252 | B2 | 6/2007 |
| JP | 2007-309326 | A | 11/2007 |
| JP | 2008-8294 | A | 1/2008 |
| JP | 2008-020095 | A | 1/2008 |
| JP | 2008-114838 | A | 5/2008 |
| JP | 2008-121961 | A | 5/2008 |
| JP | 2008-304125 | A | 12/2008 |
| JP | 2009-62977 | A | 3/2009 |
| JP | 2010-31870 | A | 2/2010 |
| JP | 2002-174427 | A | 6/2012 |

OTHER PUBLICATIONS

Rehman "Development of a Thermoacoustic Model for Evaluating Passive Damping Strategies", 2005, University of California Energy Institute pp. 18-19.*

Yamanaka, "Application of the Helmholtz Resonator for Reducing the Combustion Oscillation in a Gas Turbine", 2003, Proceedings of the International Gas Turbine Congress 2003 Tokyo.*

International Search Report of PCT/JP2012/066596, dated Aug. 21, 2012, with Forms PCT/ISA/237 and PCT/ISA/220.

Notification of Transmittal of Translation of the International Preliminary Report on Patentability (Form PCT/IB/338) of International Application No. PCT/JP2012/066596 mailing date of Jan. 16, 2014, with Forms PCT/IB/373, PCT/ISA/237, and PCT/IB/326.

Chinese Office Action dated Oct. 10, 2014 issued in corresponding Chinese Application No. 201280030030.6; w/ English Translation. (12 pages).

Extended European Search Report, dated Jan. 28, 2015, issued in corresponding European Patent Application No. 12807850.8, 6 pages.

* cited by examiner

GAS TURBINE COMBUSTOR

FIELD OF THE INVENTION

A present disclosure relates to a gas turbine combustor for combusting fuel to produce combustion gas.

BACKGROUND

Conventionally, in order to control a combustion oscillation, the gas turbine combustor having a resonance device is known. The resonance device is called an acoustic liner and is attached to an outer periphery of a combustor basket of the combustor.

For example, disclosed in Patent Literature 1 is a gas turbine combustor in which an acoustic liner having a hollow space (a resonance space) is mounted on an outer periphery of a cylindrical part of the combustor and the hollow space communicates with acoustic absorption holes (acoustic holes) formed in the cylindrical part of the combustor.

Moreover, arranging the acoustic absorption holes and the acoustic liner near a combustion area (i.e. near a flame) is also indicated, from a viewpoint of effectively controlling combustion oscillation (see paragraph 0011).

On the other hand, the gas turbine combustor having a plurality of resonance devices is known.

For example, a gas turbine combustor equipped with two acoustic liners in the direction of a flow of the combustion gas of a combustion liner is indicated by Patent Literature 2 and Patent Literature 3 (see FIG. 1 of Patent Literature 2 and FIG. 2 of Patent Literature 3).

Moreover, disclosed in Patent Literature 4 is a gas turbine combustor having an acoustic liner and an acoustic damper connected to the acoustic liner mounted on the combustion liner (see FIG. 6).

Furthermore, disclosed in Patent Literature 5 is a gas turbine combustor having a plurality of damping devices attached to a transition piece. The damping device is formed of an acoustic liner and an acoustic damper connected to the acoustic liner (see FIG. 17).

CITATION LIST

Patent Literature

[PTL1]
JP 2002-174427 A
[PTL2]
JP2006-97981 A
[PTL3]
JP 2008-20095 A
[PTL4]
JP 2007-132640 A
[PTL5]
JP 2006-266671 A

SUMMARY

Technical Problem

It was conventionally though that, when the combustor basket is installed with one acoustic liner capable of suppressing the combustion oscillation of a broad frequency range (for example, about 1.5-5 kHz), problems, such as generation of cracks resulting from a combustion oscillation, were fully solvable.

However, as a result of diligent examination by the inventors, it was confirmed that the combustion oscillation of the particular high frequency (for example, about 5.5 kHz) outside the frequency band of the above-mentioned acoustic liner may also be generated depending on operating conditions of a gas turbine.

This is considered due to the fact that, since the operating conditions (magnitude of a load) of the gas turbine is not always consistent, the length of a flame formed in the inner space of the combustor basket fluctuates, and characteristics of combustion oscillation change depending on the flame length.

And it became clear by further examination by these inventors, that the combustion oscillation of the above particular high frequency takes place when the flame position is shifted toward a downstream side in the direction of the combustion gas flow compared to a position corresponding to the frequency band which can be suppressed by the acoustic liner, and also the combustion takes place near a wall surface of the combustor basket.

Then, it is conceivable, in reference to the disclosure of Patent Literature 1, to make an acoustic liner broad compared with the former acoustic liner and to expand the installation area of the acoustic liner to the flame position corresponding to the combustion oscillation of the above-mentioned particular high frequency so as to arrange the acoustic liner near the combustion zone (flame).

However, if the acoustic liner is increased in width, the number of purging holes formed in a housing of the acoustic liner will increase, the inflow of the compressed air into the housing through the purging holes will increase, and the amount of the compressed air used for combustion will decrease.

In contrast, although attaching two resonance devices is indicated by Patent Literature 2 through Patent Literature 5, there is no disclosure as to by what positional relation each resonance device is arranged to effectively suppress the combustion oscillation at the above particular high frequency.

In view of the above-mentioned situation, it is an object of at least one embodiment of the present invention to provide a gas turbine combustor capable of reducing the combustion oscillation of high frequency while inhibiting decline of the supply amount of the compressed air for combustion.

According to at least one embodiment of the present invention, a gas turbine combustor comprises a combustor basket, a first resonance device, and a second resonance device. In the combustor basket combustion gas flows and the combustion gas is produced by combustion of fuel injected from at least one nozzle. The first resonance device is mounted on an outer surface of the combustor basket. The second resonance device is for damping combustion oscillation of a frequency higher than the first resonance device and the second resonance device is mounted on the outer surface of the combustor basket so as to be disposed on a downstream side from the first resonance device in a flow of the combustion gas. The first resonance device and the second resonance device are acoustic liners each having a housing mounted to the outer surface of the combustor basket. A resonance space surrounded by the housing and the outer surface of the combustor basket communicates with an interior space of the combustor basket via a plurality of acoustic holes formed in the combustor basket.

In the above gas turbine combustor, in addition to the first resonance device, the second resonance device is provided to damp the combustion oscillation of the frequency wave higher than the first resonance device. Thus, the combustion oscillation of a particular high-frequency wave below or above the frequency band of the first resonance device can be damped by the second resonance device. Moreover, by arranging the second resonance device downstream from the first resonance device in a flow direction of the combustion gas, the second resonance device is arranged nearer to a flame position in the case of the combustion oscillation of the particular high-frequency wave occurring below or above the frequency band of the first resonance device, thereby improving the damping effect on the combustion oscillation of the high-frequency wave by the second resonance device. Further, by using the first and second resonance devices, instead of one wide resonance device, it is possible to suppress the increase of the mounting area of the resonance devices, and also to avoid the decline in the supply amount of the compressed air for combustion by minimizing the number of purging holes which the resonance device normally has.

In some embodiments, the resonance space of the second resonance device has a height smaller than the resonance space of the first resonance device.

By setting the height of the resonance space of the second resonance device relatively small, the combustion oscillation of the high-frequency wave can be damped effectively by the second resonance device. Further, with the second resonance device being more compact, layout of the second resonance device is made easier.

The above gas turbine combustor may further comprise a transition piece for introducing the combustion gas produced in the combustor basket to a turbine, a spring clip for connecting the upstream end of the transition piece and the downstream end of the combustor basket to each other by elastic force, and a baggy clip for pressing the spring clip toward the upstream end of the transition piece. The transition piece is arranged so that an upstream end of the transition piece overlaps an outer periphery of a downstream end of the combustor basket. The second resonance device may be housed in a space surrounded by the baggy clip and the outer surface of the downstream end of the combustor basket.

By housing the second resonance device in the space surrounded by the baggy clip and the outer surface of the downstream end of the combustor basket, it is possible to utilize the space under the baggy clip.

In some embodiments, the at least one nozzle includes a pilot nozzle arranged on a center axis of the combustor basket and a plurality of main nozzles arranged on an outer circumference of the pilot nozzle, and a relationship of $0.8 \leq L_2/D_2 \leq 1.1$ is established where $D_2$ is a diameter of the combustor basket at a mounting position of the second resonance device and $L_2$ is a distance between a downstream end of a main-nozzle external cylinder surrounding the main nozzle and the mounting position of the second resonance device.

As a result, the combustion oscillation of the particular high-frequency wave below or above the frequency band of the first resonance device can be effectively suppressed by the second resonance device.

In some embodiments, a relationship of $0.05 \leq W_2/D_2 \leq 0.3$ is established where $D_2$ is a diameter of the combustor basket at a mounting position of the second resonance device and $W_2$ is a width of the resonance space of the second resonance device in a longitudinal direction of the combustor basket.

As a result, while downsizing the second resonance device, the second resonance device is capable of effectively suppressing the combustion oscillation of a particular high-frequency wave outside the frequency band of the first resonance device.

In some embodiments, a relationship of $0.005 \leq h_2/D_2 \leq 0.02$ is established where $D_2$ is a diameter of the combustor basket at a mounting position of the second resonance device and $h_2$ is a height of the resonance space of the second resonance device.

As a result, while making the second resonance device compact, it is possible to achieve a significant damping effect by the second resonance device damping the combustion oscillation of the high-frequency wave above the frequency band of the first resonance device.

Solution to Problem

According to at least one embodiment of the present invention, in addition to the first resonance device, the second resonance device is provided to damp the combustion oscillation of the frequency wave higher than the first resonance device. Thus, the combustion oscillation of a particular high-frequency wave below or above the frequency band of the first resonance device can be damped by the second resonance device. Moreover, by arranging the second resonance device downstream from the first resonance device in a flow direction of the combustion gas, the second resonance device is arranged nearer to a flame position in the case of the combustion oscillation of the particular high-frequency wave occurring below or above the frequency band of the first resonance device, thereby improving the damping effect on the combustion oscillation of the high-frequency wave by the second resonance device. Further, by using the first and second resonance devices, instead of one wide resonance device, it is possible to suppress the increase of the mounting area of the resonance devices, and also to avoid the decline in the supply amount of the compressed air for combustion by minimizing the number of purging holes which the resonance device normally has.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

Figure 1:
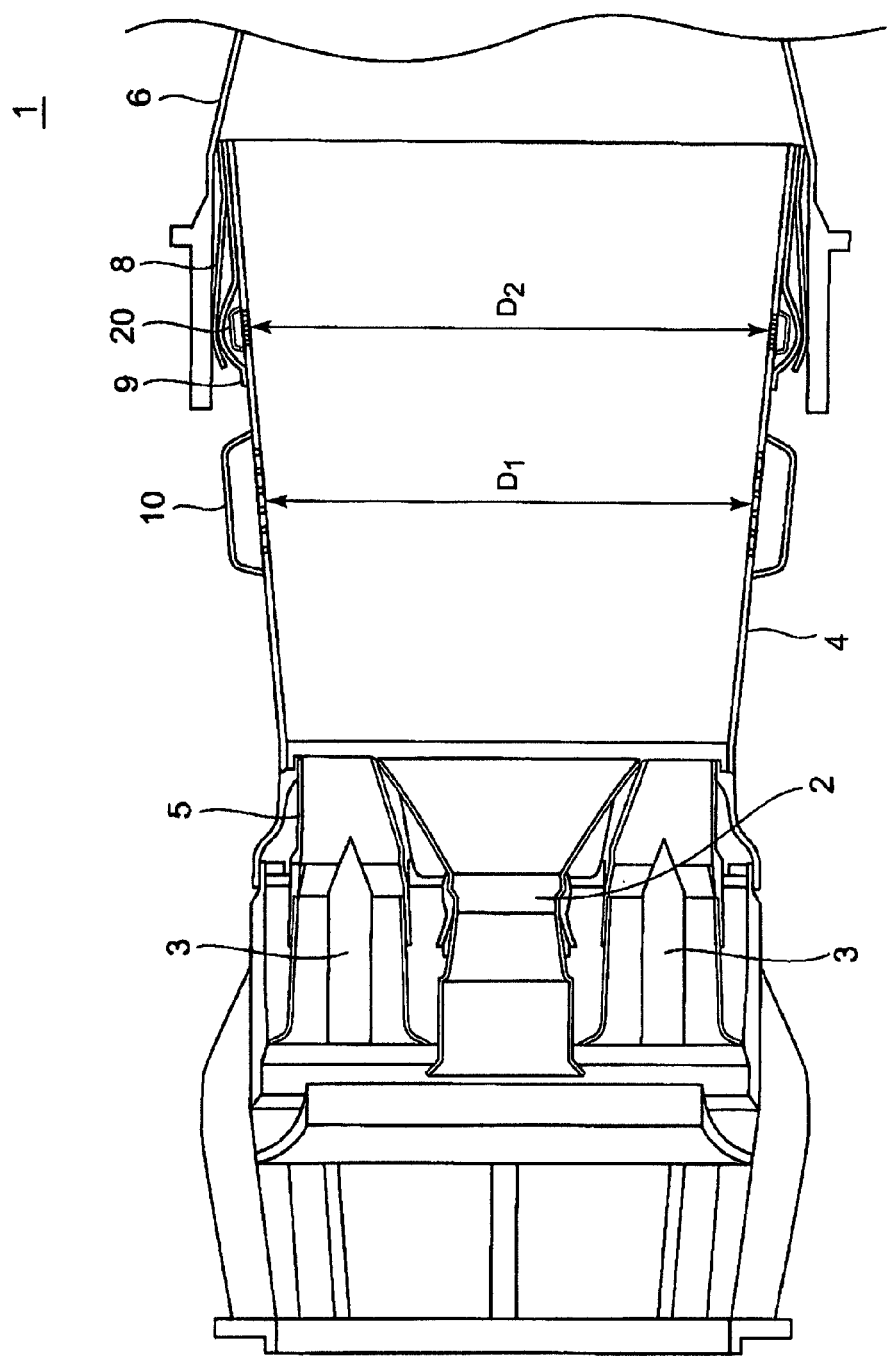
FIG. 1 is a cross-sectional view of a gas turbine combustor in relation to an embodiment.
Figure 2:
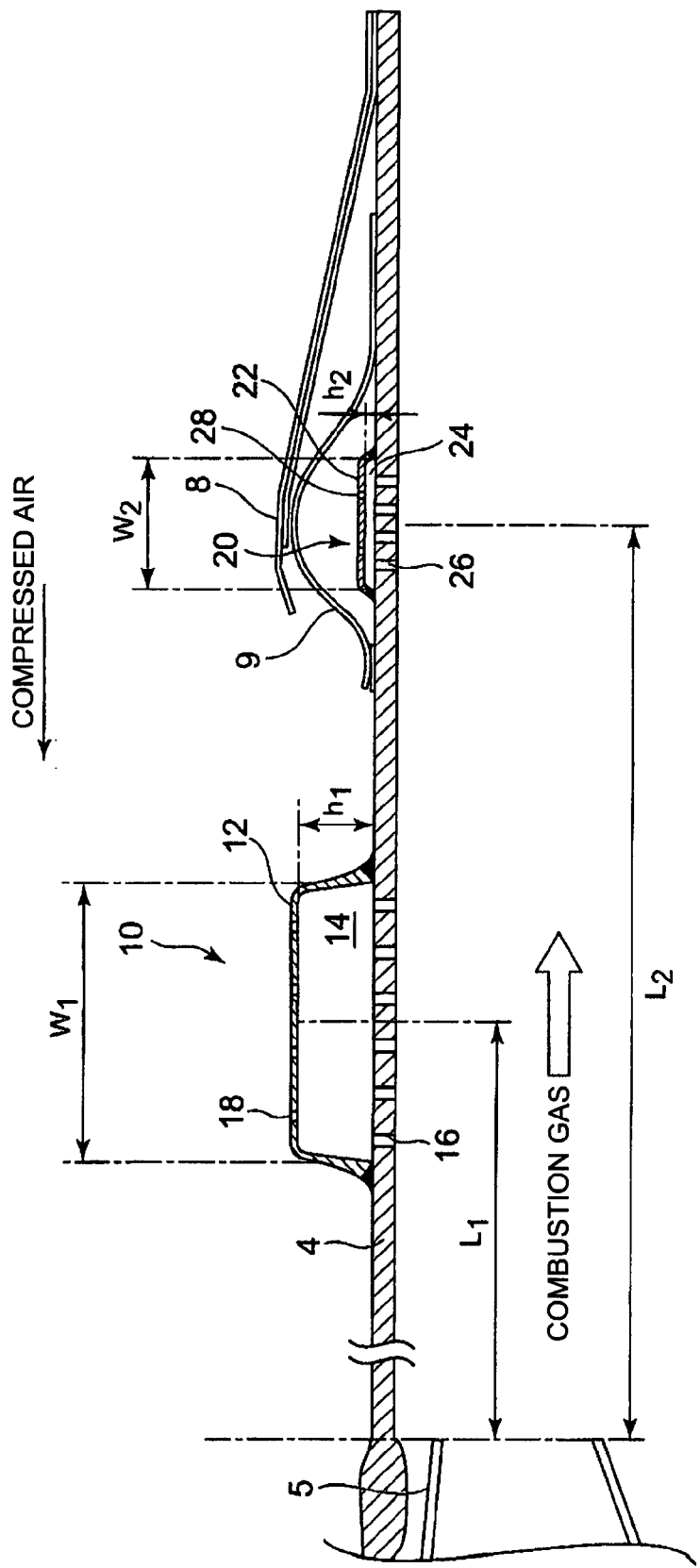
FIG. 2 is a cross-sectional view of the gas turbine combustor near resonance devices in relation to an embodiment.

FIG. 1 is a cross-sectional view of the gas turbine combustor in relation to an embodiment. FIG. 2 is a cross-sectional view of the gas turbine combustor near resonance devices in relation to an embodiment.

As shown in FIG. 1, a gas turbine combustor (hereinafter, simply described as a "combustor") 1 is provided with nozzles 2, 3 for injecting fuel, a combustor basket (a combustor liner) 4 in which the combustion gas produced by combustion of the fuel flows, and a transition piece 6 connected to the combustor basket 4.

The combustor 1 forms a gas turbine, with a compressor and a turbine. In the gas turbine, compressed air produced in the compressor is supplied to the combustor 1 as combustion air and combustion gas produced in the combustor 1 is supplied from the combustor basket 4 to the turbine via the transition piece 6. In this manner, the turbine is driven by the combustion gas.

The combustor 1 is a premix combustor of a multi-nozzle type with a combination of a pilot nozzle 2 and a main nozzle 3. The pilot nozzle 2 is arranged on a center axis of the combustor basket 4. On an outer circumference of the pilot nozzle 2, a plurality of main nozzles 3 is arranged to surround the pilot nozzle 2. Tips of the main nozzles 3 are covered by a main-nozzle external cylinder 5.

The fuel injected from the pilot nozzle 2 is ignited when mixed with the compressed air, thereby forming a flame downstream from the pilot nozzle 2. The fuel injected from the main nozzle 3 is ignited by the flame formed downstream from the pilot nozzle 2, thereby forming a flame downstream from each of the main nozzles 3. As a result, a flow of the combustion gas having a high temperature and flowing toward the transition piece 6 is formed in an interior space of the combustor basket 4.

The transition piece 6 is connected to the combustor basket 4 by means of a spring clip 8. The transition piece 6 is arranged on an outer circumferential side of the combustor basket 4 and an upstream end of the transition piece 6 overlaps a downstream end of the combustor basket 4. The spring clip 8 has one end fixed to the outer periphery of the downstream end of the combustor basket 4 and the other end being a free end. Thus, the combustor basket 4 and the transition piece 6 are connected to each other by an elastic force of the spring clip 8. Further, a baggy clip 9 is provided between the spring clip 8 and the combustor basket 4. The baggy clip 9 presses the spring clip 8 against the inner periphery of the transition piece 6. In this manner, the combustor basket 4 and the transition piece 6 are firmly connected to each other.

On the outer surface of the combustor basket 4, a first resonance device 10 and a second resonance device 20 are provided to reduce combustion oscillation. The first resonance device 10 and the second resonance device 20 may be arranged over the entire circumference of the combustor basket 4, or partially arranged in the circumferential direction of the combustor basket 4.

As shown in FIG. 2, the first resonance device 10 is an acoustic liner with a first housing 12 attached to the outer surface of the combustor basket 4 by welding. A first resonance space 14 is surrounded by the first housing 12 and the outer surface of the combustor basket 4. The first resonance space 14 communicates with the interior space of the combustor basket 4 via a plurality of acoustic holes 16 formed in the combustor basket 4. Thus, air oscillation (a pressure wave) caused by the combustion oscillation generated in the combustor basket 4 is caught in the acoustic holes 16 so as to resonate. More specifically, the air in the first resonance space 14 and the air in the acoustic holes 16 together form a resonant system as the air in the first resonance space 14 functions as a spring. With respect to oscillation of a resonant frequency of this resonant system, the air in the acoustic hole 16 resonates intensely. The friction generated in the process decreases amplitude of the combustion oscillation.

Further, a frequency band of the combustion oscillation that can be damped by the first resonance device 10 is arbitrarily settable by adjusting the diameter of the acoustic hole 16 (the sectional area), the size of the first resonance space 14 (a height $h_1$ and a width $W_1$ of the first resonance space 14), and the like.

Further, in the first housing 12, a purging hole 18 is formed so that a part of the compressed air (the combustion air) flowing outside the combustor basket 4 enters the first resonance space 14. This prevents damages of the first housing 12 caused by contacting the high temperature combustion gas.

The compressed air flows in a direction opposite to the combustion gas flowing in the interior space of the combustor basket 4, as shown in FIG. 2.

In some embodiments, a mounting position of the first resonance device 10 is determined so that a relationship of $0.4 \leq L_1/D_1 \leq 0.7$ is established where $D_1$ is a diameter (an inner diameter) of the combustor basket 4 at the mounting position of the first resonance device 10 (see FIG. 1) and $L_1$ is a distance between a downstream end of the main-nozzle external cylinder 5 and the mounting position of the first resonance device 10 (see FIG. 2). The mounting position of the first resonance device 10, herein, is a center position of a width of the first resonance device 10 in a longitudinal direction of the combustor basket 4.

Further, in some embodiments, a width $W_1$ of the first resonance space 14 in the longitudinal direction of the combustor basket 4 (see FIG. 2) is determined so that a relationship of $0.3 \leq W_1/D_1 \leq 0.6$ is established where $D_1$ is the diameter of the combustor basket 4 at the mounting position of the first resonance device 10.

Furthermore, in some embodiments, a height $h_1$ of the first resonance space 14 (see FIG. 2) is determined so that a relationship of $0.03 \leq h_1/D_1 \leq 0.1$ is established where $D_1$ is the diameter of the combustor basket 4 at the mounting position of the first resonance device 10.

In contrast, the second resonance device 20 is arranged on a downstream side from the first resonance device 10 in a flow of the combustion gas. For instance, the second resonance device 20 may be arranged in the area where the transition piece 6 overlaps the combustor basket 4.

In at least one embodiment, a mounting position of the second resonance device 20 is determined so that a relationship of $0.8 \leq L_2/D_2 \leq 1.1$ is established where $D_2$ is a diameter (an inner diameter) of the combustor basket 4 at the mounting position of the second resonance device 20 (see FIG. 1) and $L_2$ is a distance between the downstream end of the main-nozzle external cylinder 5 and the mounting position of the second resonance device 20 (see FIG. 2). As a result, the second resonance device 20 is arranged closer to the flame position when the combustion oscillation of high frequency occurs and thus, the combustion oscillation of high frequency can be effectively suppressed by the second resonance device 20.

The mounting position of the second resonance device 20, herein, is a center position of a width of the second resonance device 20 in a longitudinal direction of the combustor basket 4.

Just like the first resonance device 10, the second resonance device 20 is also an acoustic liner having a second housing 22 attached to the outer surface of the combustor basket 4. A second resonance space 24 is surrounded by the second housing 22 and the outer surface of the combustor basket 4. The second resonance space 24 communicates with the interior space of the combustor basket 4 via a plurality of acoustic holes 26 formed in the combustor basket 4. Thus, with a mechanism similar to the case of the first resonance device 10, the resonance device 20 is capable of damping the combustion oscillation of a prescribed frequency. In the second housing 22, a purging hole 28 is formed so that a part of the compressed air flowing outside the combustor basket 4 enters the second resonance space 24.

A frequency band of the combustion oscillation that can be damped by the second resonance device 20 is arbitrarily settable by adjusting the diameter (the sectional area) of the acoustic hole 26, the size of the second resonance space 24 (a height $h_2$ and a width $W_2$ of the second resonance space 24), and the like. Further, the frequency band of the combustion oscillation that can be damped by the second resonance device 20 is set higher than the frequency band of the combustion oscillation that can be damped by the first resonance device 10.

In at least one embodiment, a width $W_2$ of the second resonance space 24 in the longitudinal direction of the combustor basket 4 (see FIG. 2) is determined so that a relationship of $0.05 \leq W_2/D_2 \leq 0.3$ is established where $D_2$ is a diameter of the combustor basket 4 at the mounting position of the second resonance device 20.

As a result, while downsizing the second resonance device 20, the second resonance device 20 is capable of effectively suppressing the combustion oscillation of a particular high-frequency wave outside the frequency band of the first resonance device 10.

Further, in at least one embodiment, a height $h_2$ of the second resonance space 24 (see FIG. 2) is determined so that a relationship of $0.005 \leq h_2/D_2 \leq 0.02$ is established where $D_2$ is the diameter of the combustor basket 4 at the mounting position of the second resonance device 20.

As a result, while downsizing the second resonance device 20, it is possible to achieve a significant damping effect on the combustion oscillation of the high-frequency wave by the second resonance device 20.

Further, in at least one embodiment, the height $h_2$ of the second resonance space 24 is smaller than the height $h_1$ of the first resonance space 14.

By setting the height $h_2$ of the second resonance space 24 of the second resonance device 20 relatively small in this manner, the combustion oscillation of the high-frequency wave can be damped effectively in the second resonance device 20. Further, by downsizing the second resonance device 20, layout of the second resonance device 20 is made easier. For instance, it becomes possible to house the second resonance device 20 in a space surrounded by the baggy clip 9 and the outer surface of the combustor basket 4, thereby utilizing the space under the baggy clip 9.

As described above, in the above embodiments, in addition to the first resonance device 10, the second resonance device 20 is provided to damp the combustion oscillation of the frequency wave higher than the first resonance device 10. Thus, the combustion oscillation of the particular high-frequency wave below or above the frequency band of the first resonance device 10 can be damped by the second resonance device 20. Moreover, by arranging the second resonance device 20 downstream from the first resonance device 10 in the flow of the combustion gas, the second resonance device 20 is arranged nearer to the flame position of the case when the combustion oscillation of the particular high-frequency wave occurs below or above the frequency band of the first resonance device 10, thereby improving the damping effect on the combustion oscillation of the high-frequency wave by the second resonance device 20. Further, by arranging the first and second resonance devices 10, 20, instead of one wide resonance device, it is possible to suppress the increase of the mounting area of the resonance devices 10, 20, and also to avoid the decline in the supply amount of the compressed air for combustion by minimizing the number of the purging holes 18, 28 which the resonance device normally has.

While the embodiments of the present invention have been described, it is obvious to those skilled in the art that various changes may be made without departing from the scope of the invention.

REFERENCE SIGNS LIST

1 Gas turbine combustor (Combustor)
2 Pilot nozzle
3 Main nozzle
4 Combustor basket
5 Main-nozzle external cylinder
6 Transition piece
8 Spring clip
9 Baggy clip
10 First resonance device
12 First housing
14 First resonance space
16 Acoustic hole
18 Purging hole
20 Second resonance device
22 Second housing
24 Second resonance space
26 Acoustic hole
28 Purging hole

The invention claimed is:

1. A gas turbine combustor comprising:
a combustor basket in which combustion gas flows, the combustion gas being produced by combustion of fuel injected from at least one nozzle; and
a plurality of acoustic liners each including a housing mounted on an outer surface of the combustor basket, the housings of the plurality of the acoustic liners being separate from each other so that each of the housings together with the outer surface of the combustor basket forms an individual resonance space for each of the acoustic liners,
wherein each housing is mounted to an outer surface of a diverging portion of the combustor basket,
wherein the plurality of the acoustic liners includes:
a first acoustic liner disposed on an upstreammost side in terms of a flow direction of the combustion gas; and
a second acoustic liner for damping combustion oscillation of a frequency higher than the first acoustic liner, the second acoustic liner being mounted on the outer surface of the combustor basket so as to be disposed on a downstream side from the first acoustic liner in a flow of the combustion gas,
wherein the individual resonance space of each of the acoustic liners communicates with an interior space of the combustor basket via at least one acoustic hole formed through the combustor basket.

2. The gas turbine combustor according to claim 1,
wherein the first and second acoustic liners are disposed in a flat region of the outer surface of the combustion basket, and
wherein a relationship of $h_1 > h_2$ is satisfied, where $h_1$ is a height of the resonance space of the first acoustic liner defined by a maximum distance between an interior surface of the housing of the first acoustic liner and the flat region of the outer surface, and $h_2$ is a height of the resonance space of the second acoustic liner defined by a maximum distance between an interior surface of the housing of the second acoustic liner and the flat region of the outer surface.

3. The gas turbine combustor according to claim 1,
wherein the at least one nozzle includes a pilot nozzle arranged on a center axis of the combustor basket and a plurality of main nozzles arranged on an outer circumference of the pilot nozzle, and
wherein a relationship of $0.8 \leq L_2/D_2 \leq 1.1$ is established where $D_2$ is a diameter of the combustor basket at a mounting position of the second acoustic liner and $L_2$ is a distance between a downstream end of a main-nozzle external cylinder surrounding the main nozzle and the mounting position of the second acoustic liner.

4. The gas turbine combustor according to claim 1,
wherein the housing of each of the first and second acoustic liners has a purging hole for introducing compressed air from outside of the combustor basket into the resonance space of said each of the first and second acoustic liners.

5. The gas turbine combustor according to claim 1, further comprising:
a transition piece for introducing the combustion gas produced in the combustor basket to a turbine, the transition piece being arranged so that an upstream end of the transition piece overlaps an outer periphery of a downstream end of the combustor basket,
wherein the second acoustic liner is disposed in an area where the downstream end of the combustor basket and the upstream end of the transition piece overlaps with each other.

6. The gas turbine combustor according to claim 1, wherein the plurality of the acoustic liners are disposed so that the shorter a distance between a mount position of each of the acoustic liners and a down-stream end of the gas turbine combustor is, the higher the frequency of the combustion oscillation each of the acoustic liners is configured to damp is.

7. A gas turbine combustor comprising:
a combustor basket in which combustion gas flows, the combustion gas being produced by combustion of fuel injected from at least one nozzle; and
a first resonance device; and
a second resonance device for damping combustion oscillation of a frequency higher than the first resonance device, the second resonance device being mounted on the outer surface of the combustor basket so as to be disposed on a downstream side from the first resonance device in a flow of the combustion gas,
wherein the first resonance device and the second resonance device are acoustic liners each having a housing mounted to the outer surface of the combustor basket, and
wherein a resonance space surrounded by the housing and the outer surface of the combustor basket communicates with an interior space of the combustor basket via a plurality of acoustic holes formed in the combustor basket,
wherein the gas turbine combustor further comprising:
a transition piece for introducing the combustion gas produced in the combustor basket to a turbine, the transition piece being arranged so that an upstream end of the transition piece overlaps an outer periphery of a downstream end of the combustor basket;
a spring clip for connecting the upstream end of the transition piece and the downstream end of the combustor basket to each other by elastic force; and
a baggy clip for pressing the spring clip toward the upstream end of the transition piece,
wherein the second resonance device is housed in a space surrounded by the baggy clip and the outer surface of the downstream end of the combustor basket.

8. The gas turbine combustor according to claim 7,
wherein a height of the resonance space of the second resonance device is lower than a height of the resonance space of the first resonance device.

9. A gas turbine combustor comprising:
a combustor basket in which combustion gas flows, the combustion gas being produced by combustion of fuel injected from at least one nozzle; and
a first resonance device; and
a second resonance device for damping combustion oscillation of a frequency higher than the first resonance device, the second resonance device being mounted on the outer surface of the combustor basket so as to be disposed on a downstream side from the first resonance device in a flow of the combustion gas,
wherein the first resonance device and the second resonance device are acoustic liners each having a housing mounted to the outer surface of the combustor basket, and
wherein a resonance space surrounded by the housing and the outer surface of the combustor basket communicates with an interior space of the combustor basket via a plurality of acoustic holes formed in the combustor basket,
wherein a relationship of $0.05 \leq W_2/D_2 \leq 0.3$ is established where $D_2$ is a diameter of the combustor basket at a mounting position of the second resonance device and $W_2$ is a width of the resonance space of the second resonance device in a longitudinal direction of the combustor basket.

10. A gas turbine combustor comprising:
a combustor basket in which combustion gas flows, the combustion gas being produced by combustion of fuel injected from at least one nozzle; and
a first resonance device; and
a second resonance device for damping combustion oscillation of a frequency higher than the first resonance device, the second resonance device being mounted on the outer surface of the combustor basket so as to be disposed on a downstream side from the first resonance device in a flow of the combustion gas,
wherein the first resonance device and the second resonance device are acoustic liners each having a housing mounted to the outer surface of the combustor basket, and
wherein a resonance space surrounded by the housing and the outer surface of the combustor basket communicates with an interior space of the combustor basket via a plurality of acoustic holes formed in the combustor basket,
wherein a relationship of $0.005 \leq h_2/d_2 \leq 0.02$ is established where $d_2$ is a diameter of the combustor basket at a mounting position of the second resonance device and $h_2$ is a height of the resonance space of the second resonance device.

* * * * *